United States Patent
Fukui et al.

(10) Patent No.: US 11,155,051 B2
(45) Date of Patent: Oct. 26, 2021

(54) TIRE VULCANIZING METHOD AND DEVICE

(71) Applicants: BRIDGESTONE CORPORATION, Tokyo (JP); MITSUBISHI HEAVY INDUSTRIES MACHINERY SYSTEMS, LTD., Kobe (JP)

(72) Inventors: Takeshi Fukui, Tokyo (JP); Tomoyuki Iwamoto, Hiroshima (JP); Hideki Fukuda, Hiroshima (JP); Yoshikatsu Hineno, Hiroshima (JP)

(73) Assignees: BRIDGESTONE CORPORATION, Tokyo (JP); MITSUBISHI HEAVY INDUSTRIES MACHINERY SYSTEMS, LTD.

( * ) Notice: Subject to any disclaimer, the term of this patent is extended or adjusted under 35 U.S.C. 154(b) by 0 days.

(21) Appl. No.: 16/954,205

(22) PCT Filed: Sep. 11, 2018

(86) PCT No.: PCT/JP2018/033717
§ 371 (c)(1),
(2) Date: Jun. 17, 2020

(87) PCT Pub. No.: WO2019/123736
PCT Pub. Date: Jun. 27, 2019

(65) Prior Publication Data
US 2021/0162693 A1    Jun. 3, 2021

(30) Foreign Application Priority Data
Dec. 20, 2017 (JP) .............................. JP2017-244392

(51) Int. Cl.
*B29D 30/06* (2006.01)
*B29C 33/20* (2006.01)

(52) U.S. Cl.
CPC .......... *B29D 30/0606* (2013.01); *B29C 33/20* (2013.01); *B29D 30/0629* (2013.01)

(58) Field of Classification Search
CPC ............ B29D 30/0601; B29D 30/0605; B29D 30/0606; B29D 30/0629; B29C 33/22; B29C 33/24
See application file for complete search history.

(56) References Cited

U.S. PATENT DOCUMENTS 3,816,217 A * 6/1974 Barefoot ............ B29D 30/0601
156/382
3,972,978 A     8/1976 Caretta
(Continued)

FOREIGN PATENT DOCUMENTS

| CN | 1800655 A | 7/2006 |
| CN | 101186090 A | 5/2008 |

(Continued)

OTHER PUBLICATIONS

International Search Report issued in International Application No. PCT/JP2018/033717 dated Nov. 6, 2018.
(Continued)

*Primary Examiner* — James P Mackey
(74) *Attorney, Agent, or Firm* — Solaris Intellectual Property Group, PLLC

(57) ABSTRACT

A tire vulcanizing method comprises: a step of causing a connecting body, at which an upper mold of a vulcanization mold is supported and that connects together upper end portions of upper tubes of a plurality of supporting pillars, the supporting pillars being disposed so as to be apart in a peripheral direction at a periphery of the vulcanization mold, which is formed from a lower mold and the upper mold, which is set above the lower mold, and the supporting pillars having lower tubes that are hollow and the upper tubes, which are hollow and are slidably engaged with the lower (Continued)

tubes, and the supporting pillars extending in a vertical direction, to, together with the upper tubes and the upper mold, approach the lower mold, and close the vulcanization mold; and a step of vulcanizing an unvulcanized tire that is accommodated at an interior of the vulcanization mold that is closed, wherein the causing the connecting body, the upper tubes and the upper mold to approach the lower mold is carried out by operating raising/lowering mechanisms that are accommodated at interiors of the supporting pillars.

8 Claims, 4 Drawing Sheets

(56) References Cited

U.S. PATENT DOCUMENTS

| | | | |
|---|---|---|---|
| 4,804,318 | A | 2/1989 | Fujieda et al. |
| 5,316,458 | A * | 5/1994 | Lesneski ............ B29D 30/0601 425/34.1 |
| 5,462,630 | A | 10/1995 | Murakami |
| 6,338,620 | B1 | 1/2002 | Yamada et al. |
| 6,908,584 | B2 * | 6/2005 | Cole .................. B29D 30/0601 264/326 |
| 7,354,261 | B1 | 4/2008 | Hineno et al. |
| 8,636,491 | B2 * | 1/2014 | Fukuda .............. B29D 30/0601 425/47 |
| 9,033,691 | B2 * | 5/2015 | Iwamoto ................. B29C 33/22 425/28.1 |
| 2004/0032057 | A1 | 2/2004 | Cole |
| 2009/0218019 | A1 | 9/2009 | Paturle |

FOREIGN PATENT DOCUMENTS

| | | |
|---|---|---|
| CN | 201795249 U | 4/2011 |
| CN | 204185204 U | 3/2015 |
| CN | 204958224 U | 1/2016 |
| JP | S62-18217 A | 1/1987 |
| JP | S62-068708 A | 3/1987 |
| JP | S63-118209 A | 5/1988 |
| JP | H06-022810 B2 | 3/1994 |
| JP | H06-320546 A | 11/1994 |
| JP | H07-186149 A | 7/1995 |
| JP | 2000-210941 A | 8/2000 |
| JP | 2009-512584 A | 3/2009 |

OTHER PUBLICATIONS

Extended European Search Report dated Jul. 26, 2021 issued in corresponding EP Patent Application No. 18890215.9.
Search Report of the Chinese office action dated Aug. 3, 2021, from the SIPO in a Chinese patent application No. 2018800819601 corresponding to the instant patent application.

* cited by examiner

TIRE VULCANIZING METHOD AND DEVICE

TECHNICAL FIELD

The present disclosure relates to a tire vulcanizing method and device that vulcanize an unvulcanized tire that is accommodated at the interior of a vulcanization mold that is formed from a lower mold and an upper mold.

BACKGROUND ART

The device disclosed in Japanese Patent Application Publication (JP-B) No. H06-022810 for example is known as a conventional tire vulcanizing device.

This device has: a vulcanization mold that is formed from a bottom mold assembly and a top mold assembly that is set above the bottom mold assembly, and that, when closed, vulcanizes an unvulcanized tire that is accommodated at the interior thereof; a total of two sets of supporting pillars, with each set including two supporting pillars, that are disposed at the periphery of the vulcanization mold and extend in the vertical direction, and that have a hollow pillar body that is hollow and a solid pillar body that is slidably engaged with the hollow pillar body; an upper slide that connects the upper end portions of the solid pillar bodies of the supporting pillars, and at which the top mold assembly of the vulcanization mold is supported; and a raising/lowering mechanism that is formed from a fluid cylinder, a screw shaft or the like, and that is disposed between the respective sets of supporting pillars, and that, by raising and lowering the solid pillar bodies, makes the top mold assembly, together with the upper slide, approach and move away from the bottom mold assembly.

SUMMARY OF INVENTION

Technical Problem

However, in such a conventional tire vulcanizing device, the raising/lowering mechanism is disposed at the outer sides of the supporting pillars, i.e., between the respective sets of the supporting pillars. Therefore, there are the problems that the device becomes large overall, and the structure thereof is complex, and it is easy for the raising/lowering mechanism to be affected by dust such that the rate of occurrence of breakdown is high.

An object of the present disclosure is to provide a tire vulcanizing method and device that can decrease the rate of occurrence of breakdown with a simple structure and while being compact.

Such an object can be achieved firstly by a tire vulcanizing method comprising: a step of causing a connecting body, at which an upper mold of a vulcanization mold is supported and that connects together upper end portions of upper tubes of a plurality of supporting pillars, the supporting pillars being disposed so as to be apart in a peripheral direction at a periphery of the vulcanization mold, which is formed from a lower mold and the upper mold, which is set above the lower mold, and the supporting pillars having lower tubes that are hollow and the upper tubes, which are hollow and are slidably engaged with the lower tubes, and the supporting pillars extending in a vertical direction, to, together with the upper tubes and the upper mold, approach the lower mold, and close the vulcanization mold; and a step of vulcanizing an unvulcanized tire that is accommodated at an interior of the vulcanization mold that is closed, wherein the causing the connecting body, the upper tubes and the upper mold to approach the lower mold is carried out by operating raising/lowering mechanisms that are accommodated at interiors of the supporting pillars.

Advantageous Effects of Invention

In the present disclosure, the raising/lowering mechanisms are accommodated at the interiors of the supporting pillars. By operating the raising/lowering mechanisms and lowering the upper tubes, the connecting body is, together with the upper tubes and the upper mold, made to approach the lower mold, and the vulcanization mold is closed. Therefore, compactness of, and simplification of the structure of, the device on the whole can be devised easily. Moreover, because the raising/lowering mechanisms are covered from the outer sides by the supporting pillars, effects of dust can be effectively suppressed, and the rate of occurrence of breakdown can be reduced easily.

DESCRIPTION OF EMBODIMENTS

Figure 1:
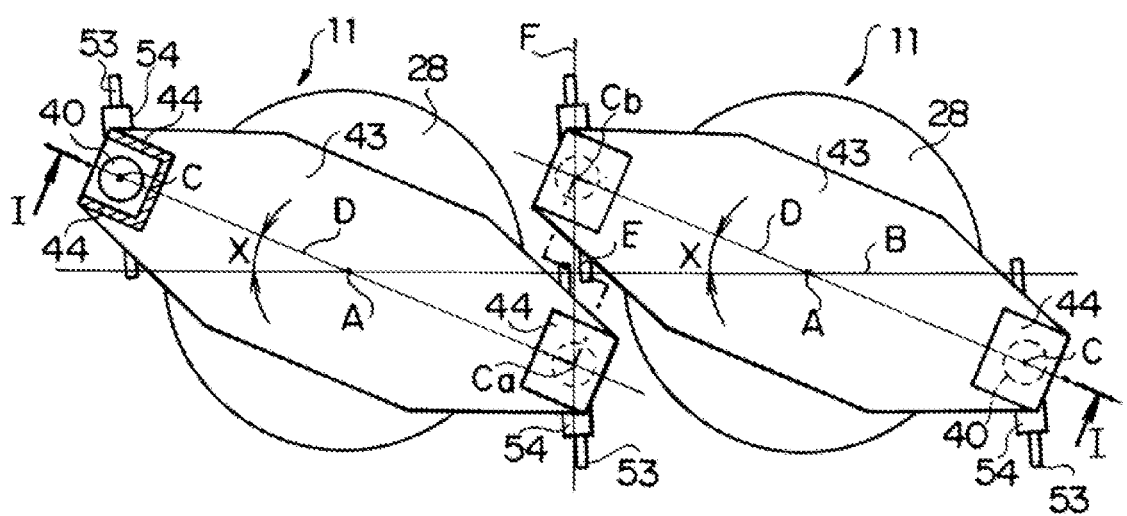
FIG. 1 is a schematic plan view showing embodiment 1 of this invention.
Figure 2:
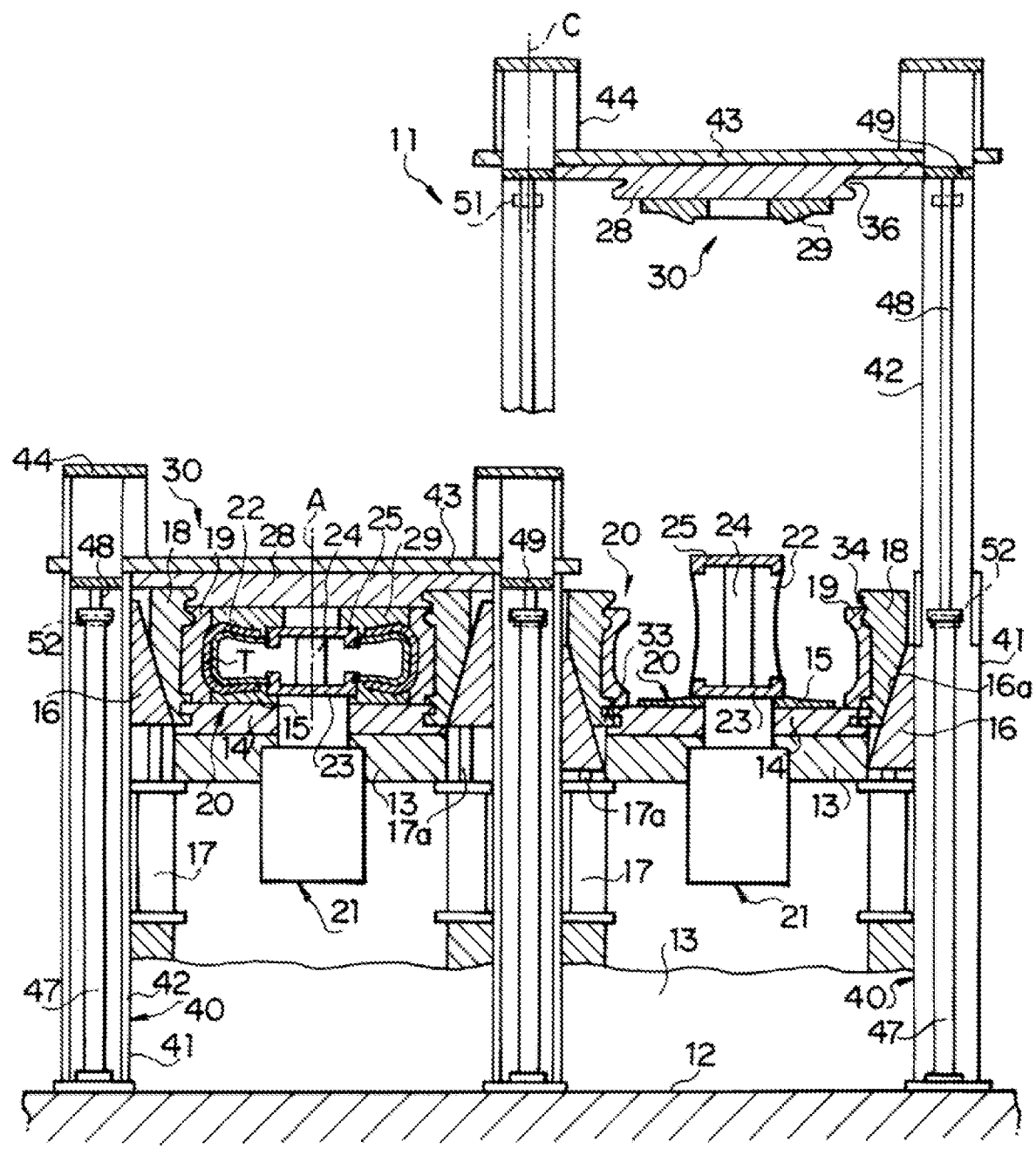
FIG. 2 is a cross-sectional view seen in the direction of arrow I-I of FIG. 1, and whose left half shows a state at the time of vulcanization, and whose right half shows a state at the time of standby.
Figure 3:
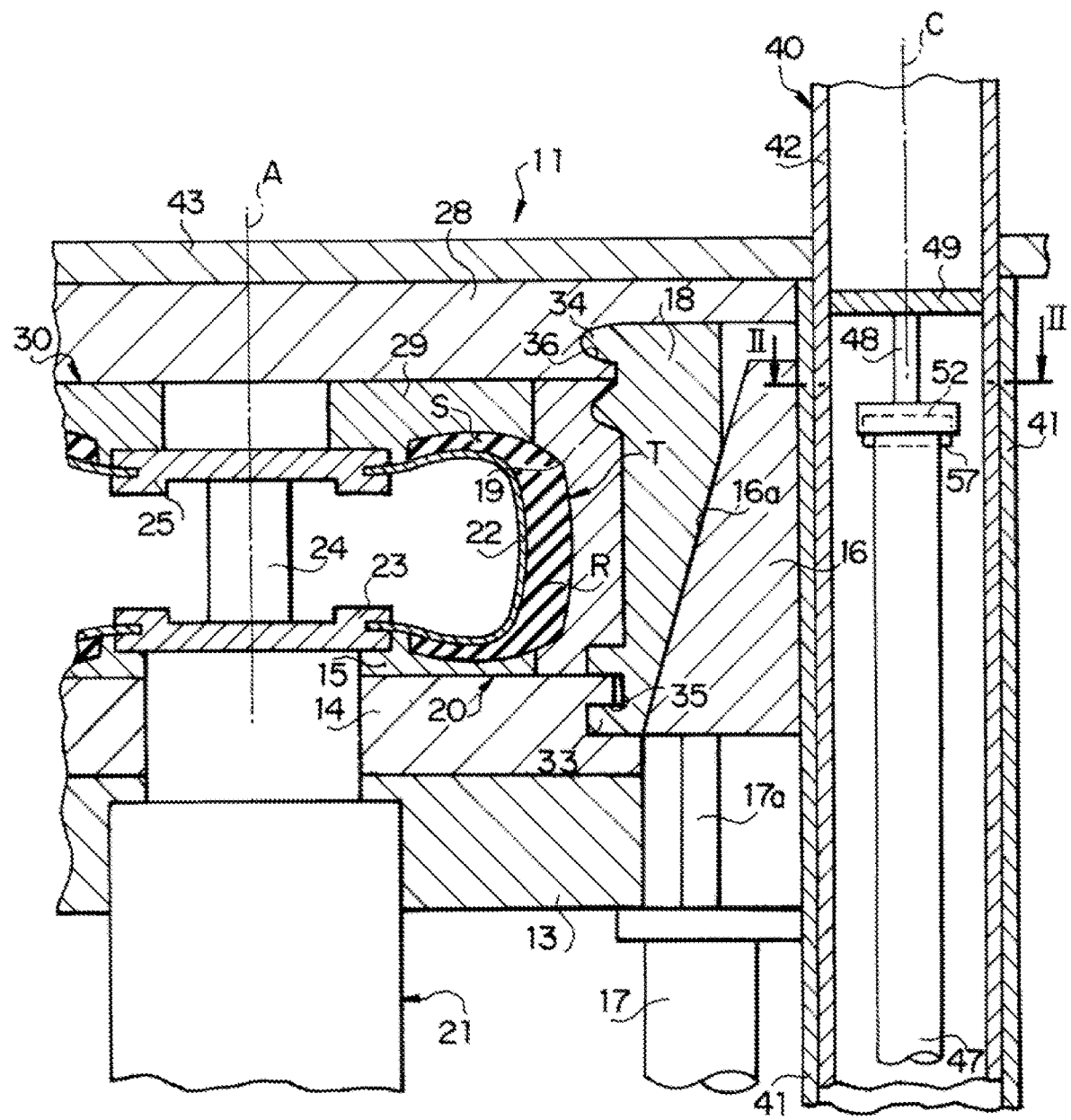
FIG. 3 is an enlarged sectional view of a vicinity of a vulcanization mold.

Embodiment 1 of this invention is described hereinafter on the basis of the drawings. In FIGS. 1, 2 and 3, 11 are plural tire vulcanizing devices that vulcanize unvulcanized tires T. Each of the tire vulcanizing devices 11 has a base 13 that is placed on a floor surface 12. Lower plates 14 that include lower platens are mounted on these bases 13. Bottom molds 15 that are ring-shaped are mounted to the top surfaces of the lower plates 14. The unvulcanized tire T, which has been conveyed into the tire vulcanizing device 11 and is in a sideways state, is disposed in the bottom mold 15. At the time of vulcanization, the bottom mold 15 can shape mainly a lower sidewall portion S of the unvulcanized tire T. An outer ring 16, which is annular and is coaxial with the bottom mold 15, is provided at the radial direction outer side of the bottom mold 15. A truncated conical surface 16a that becomes wider toward the upper side is formed at the inner periphery of the outer ring 16. 17 are plural raising/lowering cylinders that are fixed to the base 13 directly beneath the outer ring 16 and that extend in the vertical direction. The upper ends of piston rods 17a of these raising/lowering cylinders 17 are connected to the outer ring 16. As a result, when the raising/lowering cylinders 17 are operated, the outer ring 16 is raised. Note that, in the present disclosure, a motor and a screw mechanism, or a motor and a rack-and-pinion mechanism, may be used instead of the raising/lowering cylinder 17.

18 are plural, e.g., nine, sliders that are disposed at the radial direction inner side of the outer ring 16 and that are slidably engaged with the top surface of the lower plate 14. These sliders 18 are disposed in a row in the peripheral direction. Sector molds 19 of a same number as the number of sliders 18 and that have arcuate shapes are fixed to the inner peripheries of the sliders 18, respectively. These sector molds 19 can shape mainly a tread portion R of the unvulcanized tire T at the time of vulcanization. Further, the sliders 18 can move on the base 13 in the radial direction, and are connected to the outer ring 16 so as to be able to move along the truncated conical surface 16*a* thereof. As a result, when the outer ring 16 is raised by operation of the raising/lowering cylinders 17, the sector molds 19 move synchronously on the base 13 toward the radial direction inner side or the radial direction outer side due to the wedge effect of the truncated conical surface 16*a*. Due thereto, the sliders 18 and the sector molds 19 approach or move away from the bottom mold 15.

When the sliders 18 and the sector molds 19 have moved to their radial direction inner side limits, they are joined to one another in the peripheral direction and form continuous ring shapes. The composite of the bottom mold 15, which mainly shapes the aforementioned lower sidewall portion S of the unvulcanized tire T, and the plural sector molds 19, which mainly shape the tread portion R of the unvulcanized tire T, on the whole structure a lower mold 20. 21 is a central mechanism that is supported at the central portion of the base 13. A lower clamp ring 23 is fixed to the central mechanism 21. The lower clamp ring 23 can abut the bottom mold 15, and can grasp the entire periphery of the lower end of a bladder 22 that can bend easily. Further, the central mechanism 21 has a center post 24 that is solid cylindrical and extends in the vertical direction. An upper clamp ring 25 is fixed to the upper end of the center post 24. The upper clamp ring 25 grasps the entire periphery of the upper end of the bladder 22. Further, the center post 24 can be raised and lowered by the operation of an unillustrated cylinder. When the center post 24 is, together with the upper clamp ring 25, lowered to its lowered limit, a high-temperature, high-pressure vulcanization medium is supplied into the bladder 22, and the bladder 22 inflates in a donut shape.

28 is an upper plate that is set above the lower mold 20 and that includes an upper platen. A top mold 29, which can abut the upper clamp ring 25 and is formed in a ring shape, is mounted to the lower surface of the upper plate 28. Here, in the present embodiment, the upper mold of the tire vulcanizing device 11 is structured from the top mold 29 alone. The top mold 29 can mainly shape the upper sidewall portion S of the unvulcanized tire T at the time of vulcanization. As a result, in the same way as the upper plate 28, the top mold 29 also is set above the lower mold 20. The top mold 29 that serves as the upper mold and the lower mold 20, on the whole, structure a vulcanization mold 30 that is annular and that, when closed, vulcanizes the unvulcanized tire T that is accommodated at the interior thereof. Further, when, together with the raising of the outer ring 16, the sliders 18 and the sector molds 19 are moved toward their radial direction inner side limits, and the upper plate 28 and the top mold 29 are lowered to their lowered limits by the raising/lowering mechanisms that are described later, the vulcanization mold 30 is closed, and the unvulcanized tire T is accommodated so as to be sealed airtight within the vulcanization mold 30. On the other hand, the vulcanizing medium is supplied to the interior of the lower platen, the interior of the upper platen, and the interior of the bladder 22, and the unvulcanized tire T is thereby vulcanized.

Note that, in the present disclosure, the lower mold may be structured from the bottom mold alone, and, on the other hand, the upper mold may be structured from a composite of the top mold and plural sector molds. In this case, it suffices for the sector molds to be joined, so as to be able to be raised and lowered, to an outer ring that is fixed to the lower surface of the upper plate and that has, at the inner periphery thereof, a truncated conical surface that widens toward the lower side. Further, in the present disclosure, the above-described plural sector molds may be omitted, and the vulcanization mold may be structured from a top mold and a bottom mold that are divided in two vertically. In this case, it suffices for the tread portion R to be shaped by the radial direction outer end portions of the top mold and the bottom mold. Moreover, in the present disclosure, the sector molds may be moved in the radial direction by the wedge effect of the outer ring, due to the outer ring being kept stationary and, on the other hand, the lower plate and the sliders being raised and lowered by fluid cylinders. Engaging projections 33, which project-out toward the radial direction inner side, are formed at the inner peripheries of the lower portions of the sliders 18. Further, engaging projections 34 that are similar to the engaging projections 33 are respectively formed at the inner peripheries of the upper portions of the sliders 18. Anchoring recesses 35, which are concave toward the radial direction inner side, are formed at the outer periphery of the lower plate 14 that faces the engaging projections 33. Further, anchoring recesses 36, which are concave toward the radial direction inner side, are formed in the outer periphery of the upper plate 28.

Further, when the sliders 18 and the sector molds 19 move to their radial direction inner side limits and the vulcanization mold 30 is closed as described above, these engaging projections 33, 34 penetrate into the anchoring recesses 35, 36, respectively. Due thereto, the engaging projections 33, 34 and the anchoring recesses 35, 36 engage. By doing so, even if a large mold opening force is applied to the vulcanization mold 30 by the vulcanizing medium at the time of vulcanization when the vulcanization mold 30 is closed, the sliders 18 assume about half of this mold opening force, and the upper mold and the lower mold can be held so as to not come apart from one another. Note that, in the present disclosure, it suffices to form engaging recesses in the inner peripheries of the lower portions and the inner peripheries of the upper portions of the respective sliders, and, on the other hand, to form anchoring projections at the outer peripheries of the lower plate and the upper plate, and, when the vulcanization mold is closed, for the anchoring projections to engage with the engaging recesses. Moreover, engaging projections may be formed in ones of the inner peripheries of the lower portions and the inner peripheries of the upper portions of the respective sliders, and engaging recesses may be formed in the others, and anchoring recesses that engage with the engaging projections, and anchoring projections that engage with the engaging recesses, may be formed in the outer peripheries of the lower plate and the upper plate.

Figure 4:
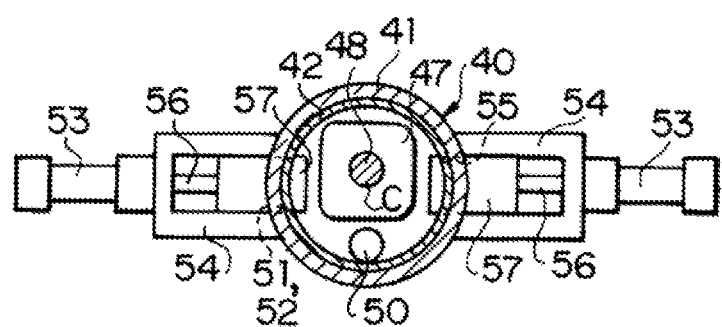
FIG. 4 is a cross-sectional view seen in the direction of arrow II-II of FIG. 3.

In FIGS. 1 through 4, plural, and here, two, supporting pillars 40 that extend in the vertical direction stand erect on the floor surface 12 at the periphery of each of the vulcanization molds 30, respectively. These supporting pillars 40 are apart from a central axis A of the vulcanization mold 30 by equal distances in the radial direction, and are disposed apart at equal angles in the peripheral direction, and here, apart by 180°. Note that, in the present disclosure, three or more of the supporting pillars may be disposed so as to be apart in the peripheral direction, at the periphery of the vulcanization mold. Each of the supporting pillars 40 has a lower tube 41, which is formed in the shape of a hollow cylindrical tube, and an upper tube 42 that is slidably engaged with the lower tube 41. The upper tube 42 has a smaller diameter than the lower tube 41, and is inserted in the lower tube 41 while maintaining the coaxial relationship therebetween. Note that, in the present disclosure, the lower tube may be made to have a smaller diameter than the upper tube, and the lower tube may be inserted in the upper tube. Moreover, a middle tube, whose diameter is between that of the lower tube and the upper tube, may be provided between the both. Namely, there is a so-called telescopic structure that can extend and contract in the axial direction (the vertical direction). 43 is a plate-shaped connecting body at whose lower surface the top mold 29, which is the upper mold of the vulcanization mold 30, is supported and fixed the via the upper plate 28. This connecting body 43 extends along a straight line D that connects the two supporting pillars 40 of the tire vulcanizing device 11.

Here, the connecting body 43 is disposed lower than the upper ends of the supporting pillars 40 (the upper tubes 42). The connecting body 43 is connected to the upper ends of the supporting pillars 40 (the upper tubes 42) via brackets 44 that are fixed to both end portions of the connecting body 43. As a result, the upper end portions of the upper tubes 42 of the supporting pillars 40 are connected via the connecting body 43 that extends horizontally above the lower mold 20. A raising/lowering cylinder 47, which serves as a raising/lowering mechanism and extends along the vertical direction, i.e., the central axis C of the supporting pillar 40 (the lower tube 41, the upper tube 42), is housed at the interior of each of the supporting pillars 40. The lower ends (head side ends) of the raising/lowering cylinders 47 are fixed to the floor surface 12. On the other hand, the upper ends (rod side ends) of piston rods 48 of the raising/lowering cylinders 47 are fixed to the upper end portions of the upper tubes 42 via brackets 49. As a result, when the raising/lowering cylinders 47 operate, the upper tubes 42 are raised and lowered while being guided by the lower tubes 41, and the supporting pillars 40 extend and contract. Due thereto, the top mold 29 (the upper mold) can, together with the upper plate 28 and the connecting body 43, be made to approach and move away from the lower mold 20. Note that, in the present disclosure, the upper ends of the piston rods of the raising/lowering cylinders may be connected to the connecting body, and, on the other hand, the connecting body and the upper ends of the upper tubes may be connected via brackets. Note that 50 is a supply/discharge tube that supplies and discharges fluid into and from the raising/lowering cylinder 47.

In this way, compactness of, and simplification of the structure of, the tire vulcanizing device 11 on the whole can be devised easily if, by accommodating the raising/lowering cylinders (the raising/lowering mechanisms) 47 within the supporting pillars 40, and operating the raising/lowering cylinders 47 and lowering the upper tubes 42, the connecting body 43 is, together with the upper tubes 42 and the top mold (the upper mold) 29, made to approach the lower mold 20, and the vulcanization mold 30 is closed. Moreover, because the raising/lowering cylinders 47 are covered by the supporting pillars 40 from the outer sides, effects of dust on the raising/lowering cylinders 47 can be suppressed effectively, and the rate of occurrence of breakdown can be easily reduced. Note that, in the present disclosure, the raising/lowering mechanism may be structured from a motor and a screw mechanism, or a motor and a rack-and-pinion mechanism.

Plural through-holes 51, 52 that extend in the radial direction are formed respectively in, of the lower tubes 41 and the upper tubes 42, the respective upper tubes 42 that are positioned at the inner side. These through-holes 51 are disposed so as to be apart by equal angles in the peripheral direction at the upper end portions of the upper tubes 42. On the other hand, the through-holes 52 are disposed so as to be apart by equal angles in the peripheral direction at the lower end portions of the upper tubes 42. 53 are plural fluid cylinders that serve as moving mechanisms and that are fixed, via brackets 54, to the outer peripheries of the upper end portions of, among the lower tubes 41 and the upper tubes 42, the respective lower tubes 41 that are positioned at the outer sides. In the same way as the through-holes 51, 52, the fluid cylinders 53 as well are disposed so as to be apart by equal angles in the peripheral direction. Plural through-holes 55 that have the same shapes as the through-holes 51, 52 are formed in the lower tubes 41 at the positions where the lower tubes 41 and extension lines of the fluid cylinders 53 intersect. These through-holes 55 and the through-holes 51 overlap one another when the upper tubes 42 are lowered to the vulcanization positions which are the lowered limits thereof and at which vulcanization can be carried out. On the other hand, the through-holes 55 and the through-holes 52 overlap one another when the upper tubes 42 are raised to the standby positions which are the raised limits thereof. Lock bodies 57 are fixed to the distal ends (the radial direction inner ends) of piston rods 56 of the fluid cylinders 53. Portions of the lock bodies 57 are usually inserted in the through-holes 55. Due to these lock bodies 57 moving toward radial direction outer sides by operation of the fluid cylinders 53, the lock bodies 57 are inserted into the through-holes 51 or the through-holes 52 that are formed in the upper tubes 42.

Further, when the lock bodies 57 are inserted into the through-holes 51 in addition to the through-holes 55, the upper tubes 42 are locked at specific vertical direction positions, and here, at the aforementioned vulcanization positions. On the other hand, when the lock bodies 57 are inserted into the through-holes 52 in addition to the through-holes 55, the upper tubes 42 are locked at specific vertical direction positions, and here, at the aforementioned standby positions. In this way, the upper tubes 42 can be stopped at desired height positions, and here, at the vulcanization positions or the standby positions, with respect to the lower tubes 41. Note that, in the present disclosure, a motor and a screw mechanism, or a motor and a rack-and-pinion mechanism, may be used as the moving mechanism. Further as described above, if, at the time of vulcanization, the engaging projections 33, 34 are inserted in the anchoring recesses 35, 36 and about half of the mold opening force is assumed by the sliders 18, the load that is applied to the connecting body 43 and the supporting pillars 40 can easily be reduced. For example, the tensile forces in the vertical direction that are applied to the lower tubes 41 and the upper tubes 42 at the time of vulcanization can be reduced. Due thereto, the supporting pillars 40 can easily be made to be thin-walled, and the raising/lowering cylinders 47 can be made to be compact, and the accommodating of the raising/lowering cylinders 47 within the supporting pillars 40 is easy. Note that, in a case in which the lower tubes are positioned at the inner sides and the upper tubes are positioned at the outer sides as described above, it suffices to form through-holes in the upper and lower end portions of the lower tubes, and to set the moving mechanisms (the fluid cylinders) at the lower end portions of the upper tubes that are at the outer sides. Further, in the present disclosure, plural through-holes 51 such as those described above may be provided so as to apart in the vertical direction, and it can be made such that the vulcanization positions can be changed in accordance with the height of the vulcanization mold 30.

Further, in a case in which the plural tire vulcanizing devices 11 such as described above are disposed such that the central axes A of the vulcanization molds 30 are positioned on a same straight line B in the same way as existing tire vulcanizing devices, if the straight lines D that connect the central axes C of the supporting pillars 40 of the respective tire vulcanizing devices 11 are disposed so as to overlap the aforementioned straight line B, the distance between the tire vulcanizing devices 11 that are adjacent to one another (between the central axes A) is large, and the vulcanization equipment becomes large. Therefore, in the present embodiment, plural (here, two) of the tire vulcanizing devices 11 are disposed as follows. Namely, the straight lines D that connect the central axes C of the supporting pillars 40 of the respective tire vulcanizing devices 11 are inclined at a same angle X in a same direction with respect to the straight line B. Further, of the supporting pillars 40 at the tire vulcanizing devices 11 that are disposed adjacent to one another, central axes Ca, Cb of the two supporting pillars 40 that are disposed near to one another are disposed on straight line F. The straight line F passes-through an intermediate point (a point that is between the central axes A and is equidistant from the central axes A) E between the central axes A of the vulcanization molds 30 of the aforementioned adjacent tire vulcanizing devices 11, and the straight line F is perpendicular to the straight line B. By doing so, vicinities of the supporting pillars 40 of tire vulcanizing devices 11 that are adjacent overlap one another, and, as a result, the plural tire vulcanizing devices 11 can be disposed at a high density, and conservation of space can be devised easily.

Operation of above-described embodiment 1 is described next. Here, it is assumed that, as shown in the right half of FIG. 2, vulcanization has ended at the tire vulcanizing device 11, and the vulcanization mold 30 has been opened. At this time, because the piston rods 48 of the raising/lowering cylinders 47 are projected-out, the upper plate 28, the top mold 29, the upper tubes 42 and the connecting body 43 are raised to their raised limits, and a large work area is formed between the lower mold 20 and the upper mold (the top mold 29). Further, due to the piston rods 56 of the fluid cylinders 53 projecting out, and the lock bodies 57 being inserted in the through-holes 52, the upper tubes 42 are locked at the standby positions (their raised limits). Further, at this time, because the piston rods 17a of the raising/lowering cylinders 17 are pulled-in, the outer ring 16 is lowered. Due thereto, the sliders 18 and the sector molds 19 synchronously move to their radial direction outer side limits, and the center post 24 of the central mechanism 21 rises, and therefore, the bladder 22 is stretched and deformed in an hourglass shape. In this state, the unvulcanized tire T is conveyed into the tire vulcanizing device 11 by an unillustrated loader, and is placed on the bottom mold 15 in a sideways state. Next, the fluid cylinders 53 are operated and the piston rods 56 pulled-in, and the lock bodies 57 are pulled-out from the through-holes 52 of the upper tubes 42 toward radial direction outer sides, and the upper tubes 42 can be raised. Thereafter, by pulling the piston rods 48 of the raising/lowering cylinders 47 in, the upper plate 28, the top mold 29, the upper tubes 42 and the connecting body 43 are integrally lowered, and the upper mold (the top mold 29) is made to approach the lower mold 20.

At this time, the piston rods 17a of the raising/lowering cylinders 17 are made to project-out, and the sliders 18 and the sector molds 19 are synchronously moved toward the radial direction inner side by the truncated conical surface 16a of the outer ring 16. On the other hand, the center post 24 and the upper clamp ring 25 of the central mechanism 21 are lowered, a low-pressure medium is supplied into the bladder 22, and the bladder 22 is inflated and deformed in the shape of a donut. Then, the sector molds 19 move to their radial direction inner side limits and form a ring shape, and the unvulcanized tire T is accommodated within the vulcanization mold 30 when the vulcanization mold 30 is closed due to the upper plate 28 and the top mold 29 moving to their lowered limits and abutting the sector molds 19. At this time, because the raising/lowering cylinders 47 are accommodated within the supporting pillars 40, compactness of, and simplification of the structure of, the tire vulcanizing device 11 on the whole can be devised easily. Moreover, because the raising/lowering cylinders 47 are covered by the supporting pillars 40 from the outer sides, effects of dust on the raising/lowering cylinders 47 can be suppressed effectively, and the rate of occurrence of breakdown of the raising/lowering cylinders 47 can be reduced easily. At this time, because the engaging projections 33, 34 of the sliders 18 are respectively inserted into the anchoring recesses 35, 36 of the lower plate 14 and the upper plate 28 and these are engaged, the bottom mold 15 and the top mold 29 are held so as to not come apart from one another. Further, at this time, the piston rods 56 of the fluid cylinders 53 are made to project-out and insert the lock bodies 57 in the through-holes 51, and the upper tubes 42 are locked at the vulcanization positions. Thereafter, a high-temperature, high-pressure vulcanization medium is supplied into the platens of the lower plate 14 and the upper plate 28 and into the bladder 22, and the unvulcanized tire T that is accommodated within the vulcanization mold 30 is vulcanized, and is thereby made into a vulcanized tire. Industrial Applicability The present disclosure can be applied to the industrial field of vulcanizing an unvulcanized tire that is accommodated in a vulcanization mold that is formed from a lower mold and an upper mold.

The disclosure of Japanese Patent Application No. 2017-244392 filed on Dec. 20, 2017 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

The invention claimed is:
1. A tire vulcanizing method comprising:
a step of causing a connecting body, at which an upper mold of a vulcanization mold is supported and that connects together upper end portions of upper tubes of a plurality of supporting pillars, the supporting pillars being disposed so as to be apart in a peripheral direction at a periphery of the vulcanization mold, which is formed from a lower mold and the upper mold, which is set above the lower mold, and the supporting pillars having lower tubes that are hollow and the upper tubes, which are hollow and are slidably engaged with the lower tubes, and the supporting pillars extending in a vertical direction to, together with the upper tubes and the upper mold, approach the lower mold, and close the vulcanization mold; and
a step of vulcanizing an unvulcanized tire that is accommodated at an interior of the vulcanization mold that is closed, wherein causing the connecting body, the upper tubes and the upper mold to approach the lower mold is carried out by operating raising/lowering mechanisms that are accommodated at interiors of the supporting pillars.

2. A tire vulcanizing device comprising:
a vulcanization mold that is formed from a lower mold and an upper mold that is set above the lower mold, and that, when closed, vulcanizes an unvulcanized tire that is accommodated at an interior of the vulcanization mold;
a plurality of supporting pillars that are disposed so as to be apart in a peripheral direction at a periphery of the vulcanization mold, that have lower tubes that are hollow and upper tubes that are hollow and are slidably engaged with the lower tubes, and that extend in a vertical direction;
a connecting body that connects together upper end portions of the upper tubes of the supporting pillars, and at which the upper mold of the vulcanization mold is supported; and
raising/lowering mechanisms that are accommodated at interiors of the supporting pillars, and that, by raising or lowering the upper tubes, cause the upper mold to, together with the connecting body, approach or move away from the lower mold.

3. The tire vulcanizing device of claim 2, wherein a plurality of the tire vulcanizing devices are disposed such that central axes A of the vulcanization molds are positioned on a same straight line B, and two supporting pillars of each of the tire vulcanizing devices are disposed so as to be apart by 180° in the peripheral direction, and a straight line D, which connects central axes C of the supporting pillars of each tire vulcanizing device, is inclined at a same angle X in a same direction with respect to the straight line B, and, of the supporting pillars at the tire vulcanizing devices that are disposed adjacent to one another, central axes C of two supporting pillars that are disposed near one another are disposed on a straight line F that is orthogonal to the straight line B and that passes-through an intermediate point E between the central axes A of the vulcanization molds of the tire vulcanizing devices that are adjacent.

4. The tire vulcanizing device of claim 2, wherein through-holes that extend in a radial direction are formed in, of the lower tubes and the upper tubes, lower tubes or upper tubes that are positioned at inner sides, and lock bodies, which can be inserted in the through-holes and which regulate vertical direction positions of the upper tubes when inserted in the through-holes, and moving mechanisms, which move the lock bodies in the radial direction, are provided at lower tubes or upper tubes that are positioned at outer sides.

5. The tire vulcanizing device of claim 2, wherein:
the lower mold is structured from a bottom mold alone that mainly shapes a lower sidewall portion of the unvulcanized tire, or from a composite of the bottom mold and a plurality of sector molds that are disposed in a row in the peripheral direction and that mainly shape a tread portion of the unvulcanized tire,
the upper mold is structured from a top mold alone that mainly shapes an upper sidewall portion of the unvulcanized tire, or from a composite of the top mold and the plurality of sector molds,
an outer ring that is annular and that, by being raised and lowered, moves the sector molds and sliders that are mounted to the sector molds respectively, synchronously in the radial direction by a truncated conical surface that is formed at an inner periphery of the outer ring,
engaging projections or engaging recesses are respectively formed in inner peripheries of lower portions or inner peripheries of upper portions of the respective sliders,
anchoring projections or anchoring recesses are respectively formed at an outer periphery of a lower plate to which the bottom mold is mounted and at an outer periphery of an upper plate to which the top mold is mounted, and
in a case in which the vulcanization mold is closed, the engaging projections are engaged with the anchoring recesses, or the anchoring projections are engaged with the engaging recesses.

6. The tire vulcanizing device of claim 1, wherein:
a plurality of the tire vulcanizing devices are disposed such that central axes A of the vulcanization molds are positioned on a same straight line B, and two supporting pillars of each of the tire vulcanizing devices are disposed so as to be apart by 180° in the peripheral direction, and a straight line D, which connects central axes C of the supporting pillars of each tire vulcanizing device, is inclined at a same angle X in a same direction with respect to the straight line B, and, of the supporting pillars at the tire vulcanizing devices that are disposed adjacent to one another, central axes C of two supporting pillars that are disposed near one another are disposed on a straight line F that is orthogonal to the straight line B and that passes-through an intermediate point E between the central axes A of the vulcanization molds of the tire vulcanizing devices that are adjacent, and
through-holes that extend in a radial direction are formed in, of the lower tubes and the upper tubes, lower tubes or upper tubes that are positioned at inner sides, and lock bodies, which can be inserted in the through-holes and which regulate vertical direction positions of the upper tubes when inserted in the through-holes, and moving mechanisms, which move the lock bodies in the radial direction, are provided at lower tubes or upper tubes that are positioned at outer sides.

7. The tire vulcanizing device of claim 1, wherein:
a plurality of the tire vulcanizing devices are disposed such that central axes A of the vulcanization molds are positioned on a same straight line B, and two supporting pillars of each of the tire vulcanizing devices are disposed so as to be apart by 180° in the peripheral direction, and a straight line D, which connects central axes C of the supporting pillars of each tire vulcanizing device, is inclined at a same angle X in a same direction with respect to the straight line B, and, of the supporting pillars at the tire vulcanizing devices that are disposed adjacent to one another, central axes C of two supporting pillars that are disposed near one another are disposed on a straight line F that is orthogonal to the straight line B and that passes-through an intermediate point E between the central axes A of the vulcanization molds of the tire vulcanizing devices that are adjacent,
the lower mold is structured from a bottom mold alone that mainly shapes a lower sidewall portion of the unvulcanized tire, or from a composite of the bottom mold and a plurality of sector molds that are disposed in a row in the peripheral direction and that mainly shape a tread portion of the unvulcanized tire,
the upper mold is structured from a top mold alone that mainly shapes an upper sidewall portion of the unvulcanized tire, or from a composite of the top mold and the plurality of sector molds, an outer ring that is annular and that, by being raised and lowered, moves the sector molds and sliders that are mounted to the sector molds respectively, synchronously in the radial direction by a truncated conical surface that is formed at an inner periphery of the outer ring, engaging projections or engaging recesses are respectively formed in inner peripheries of lower portions or inner peripheries of upper portions of the respective sliders, anchoring projections or anchoring recesses are respectively formed at an outer periphery of a lower plate to which the bottom mold is mounted and at an outer periphery of an upper plate to which the top mold is mounted, and in a case in which the vulcanization mold is closed, the engaging projections are engaged with the anchoring recesses, or the anchoring projections are engaged with the engaging recesses.

8. The tire vulcanizing device of claim 1, wherein:

a plurality of the tire vulcanizing devices are disposed such that central axes A of the vulcanization molds are positioned on a same straight line B, and two supporting pillars of each of the tire vulcanizing devices are disposed so as to be apart by 180° in the peripheral direction, and a straight line D, which connects central axes C of the supporting pillars of each tire vulcanizing device, is inclined at a same angle X in a same direction with respect to the straight line B, and, of the supporting pillars at the tire vulcanizing devices that are disposed adjacent to one another, central axes C of two supporting pillars that are disposed near one another are disposed on a straight line F that is orthogonal to the straight line B and that passes-through an intermediate point E between the central axes A of the vulcanization molds of the tire vulcanizing devices that are adjacent, through-holes that extend in a radial direction are formed in, of the lower tubes and the upper tubes, lower tubes or upper tubes that are positioned at inner sides, and lock bodies, which can be inserted in the through-holes and which regulate vertical direction positions of the upper tubes when inserted in the through-holes, and moving mechanisms, which move the lock bodies in the radial direction, are provided at lower tubes or upper tubes that are positioned at outer sides, the lower mold is structured from a bottom mold alone that mainly shapes a lower sidewall portion of the unvulcanized tire, or from a composite of the bottom mold and a plurality of sector molds that are disposed in a row in the peripheral direction and that mainly shape a tread portion of the unvulcanized tire, the upper mold is structured from a top mold alone that mainly shapes an upper sidewall portion of the unvulcanized tire, or from a composite of the top mold and the plurality of sector molds, an outer ring that is annular and that, by being raised and lowered, moves the sector molds and sliders that are mounted to the sector molds respectively, synchronously in the radial direction by a truncated conical surface that is formed at an inner periphery of the outer ring, engaging projections or engaging recesses are respectively formed in inner peripheries of lower portions or inner peripheries of upper portions of the respective sliders, anchoring projections or anchoring recesses are respectively formed at an outer periphery of a lower plate to which the bottom mold is mounted and at an outer periphery of an upper plate to which the top mold is mounted, and in a case in which the vulcanization mold is closed, the engaging projections are engaged with the anchoring recesses, or the anchoring projections are engaged with the engaging recesses.

* * * * *